July 7, 1959     A. SCHAFFER     2,893,429
MIXER VALVE
Filed May 24, 1956
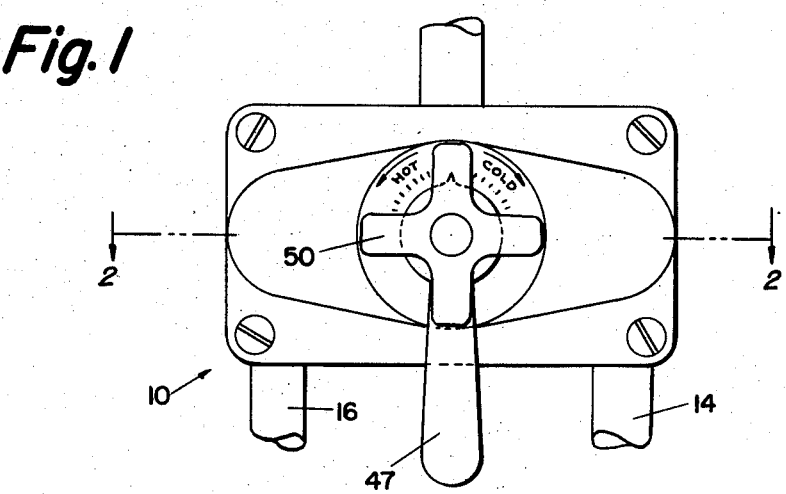
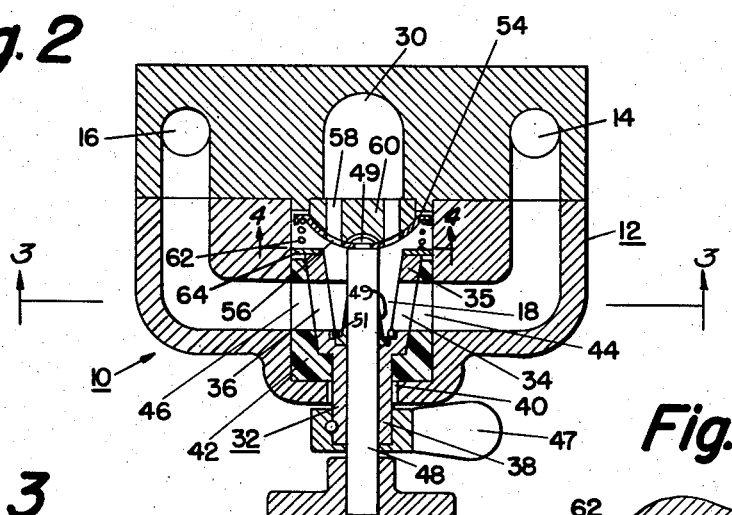
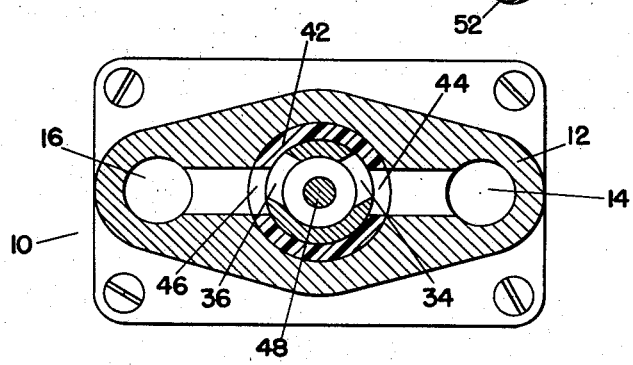
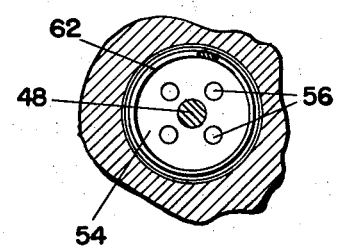
INVENTOR.
ARTHUR SCHAFFER
BY *Arthur H. Seidel*
ATTORNEY

United States Patent Office 2,893,429
Patented July 7, 1959

2,893,429
MIXER VALVE

Arthur Schaffer, Riverside, N.J.

Application May 24, 1956, Serial No. 587,125

4 Claims. (Cl. 137—625.41)

The present invention relates to a mixer valve for hot and cold water, and more particularly to a mixer valve constructed and arranged to supply a single stream of mixed hot and cold water in controlled adjustable proportions, or either hot or cold water separately, and capable of regulating the rapidity of delivery of water therefrom.

Mixer valves comprising a wide variety of structures have heretofore been proposed. However, such prior valves have suffered from the disability that by and large they constituted relatively complex structures, whose complexity rendered their rapid repair difficult. Moreover, in order to obtain leakproof operation, resort has heretofore been had to packing, gasketing, and the like. In particular, in prior valve structures where moving metal parts were involved, lubrication of the parts has proven to be most difficult, so that lubrication was sacrificed at the expense of frictional erosion and valve malfunction.

This invention has as an object the provision of a mixer valve adapted to be attached simultaneously to hot and cold water supply pipes and constructed and arranged to deliver water therefrom in selected hot, cold or lukewarm states.

This invention has as another object the provision of a mixer valve capable of regulating the rapidity of delivery of water therefrom.

This invention has as yet another object the provision of a mixer valve of relatively simple construction which is cheap and easy to manufacture, easy to repair, and yet which has a long useful life.

This invention has as still another object the provision of a mixer valve which is self-lubricating, and which avoids the use of a conventional packing or stuffing gland, and therefore requires the minimum of maintenance.

This invention has as yet another object the provision of a mixer valve in which self-lubrication of the valve is achieved and in which erosion of metal due to friction is avoided.

For the purpose of illustrating the invention there is shown in the drawings a form which is presently preferred; it being understood, however, that this invention is not limited to the precise arrangements and instrumentalities shown.

Referring to the following drawings wherein like reference characters refer to like parts:

Figure 1 is an elevational view of the mixer valve of the present invention.

Figure 2 is a sectional view taken on line 2—2 of Figure 1.

Figure 3 is a cross-sectional view of the valve shown in Figure 1.

Figure 4 is a sectional view taken on line 4—4 of Figure 2.

Referring to the drawings, 10 designates the valve of the present invention. Valve 10 includes a two piece casing 12 which is provided with a pair of intake ports 14 and 16, which open into a central recess 18.

Intake ports 14 and 16 may be joined as by conventional threaded pipe fitting means to the cold water supply and hot water supply respectively of the house within which valve 10 is positioned.

Plug 32 is positioned within central recess 18 and comprises a frustro-conical hollow member 35 integral with an axially extending cylindrical sleeve 38. The frustro-conical hollow portion 35 of plug 32 is provided with a pair of coplanar angularly spaced apart and generally radially disposed passageways 34 and 36 leading from its interior to its exterior. The sleeve portion 38 of plug 32 projects from central recess 18 through an aperture 40 in casing 12.

A liner 42, which is preferably of a non-abrasive and self-lubricating polymeric material, and which is preferably Teflon (a polymerized tetrafluoroethylene resin made by E. I. Du Pont De Nemours & Co., of Wilmington, Delaware) is disposed intermediate the wall of central recess 18 and plug 32. Teflon has the property of being self-lubricating in that a moving metal surface, such as the outer surface of plug 32, is not frictionally eroded by contact therewith, the surface of Teflon being soapy-like to the touch. Simultaneously, Teflon is both self-sealing and a tough long wearing material. Thus, liner 42 forms a liquid-tight seal with plug 32; and in particular, the passageways 34 and 36 thereof.

Liner 42 is provided with a pair of radial passageways 44 and 46 which are spaced along the same axis, so that when liner 42 is operatively positioned within central recess 18 the passageways 44 and 46 form a continuation of intake ports 14 and 16, respectively.

A stem 48 is rotatably received within plug 32 and is bushed in the sleeve portion 38 thereof. A tapered Teflon gasket 49 and O ring 51 provide a seal for stem 48. A winged handle 50 is rigidly secured over the outer end of stem 48 by means of threaded bolt 52.

The upper end of sleeve portion 38 of plug 32 projects outside of aperture 40 and is provided with a lever handle 47 which is rigidly secured thereto.

As will be seen from an examination of Figure 2, rotation of lever handle 47 will rotate plug 32 and will vary the alignment between the passageways 34 and 36 in the frustro-conical portion 35 of plug 32 with the passageways 44 and 46 in liner 42.

The innermost end of stem 48 is provided with a screw 49 on which is carried a perforated generally bell-shaped metal member 54 having a plurality of spaced openings 56 which mate with similarly spaced openings 58 in fixed Teflon valve seat 60. In the drawings four openings 56 are shown, but it is to be understood that a larger or smaller number of openings may be used. The spacing constituting the solid material of metal member 54 between openings 56 is larger than the diameter of openings 56 (see Figure 4).

A coil spring 62 formed of corrosion resistant metal is seated between member 54 and annular seating ring 64 which is operatively engaged with the bottom of frustro-conical hollow member 35.

Openings 58 in valve seat 60 open into discharge port 30.

The operation of the mixer valve 10 of the present invention is as follows:

Hot and cold water are introduced into mixer valve 10 into intake ports 16 and 14. The relative amount of hot to cold water may be regulated by rotating lever handle 47 which aligns passageways 34 and 36 of plug 32 in respect to passageways 44 and 46 of liner 42. Passageways 44 and 46 constitute extensions of intake ports 14 and 16. It is possible by manipulation of plug

32 to selectively secure hot water, or cold water, or proportionate mixtures of hot water and cold water.

The Teflon liner 42 provides both an integral watertight seal, and continuous and optimum lubrication for the plug 32. Due to the toughness of Teflon and its great durability, as well as its self-lubricating characteristics, the valve 10 may be in daily operation for greatly extended periods of time without replacement of any of the valve components.

Regulation of the amount of water discharged through mixer valve 10 is achieved by rotating the stem 48. Rotation of stem 48 results in selective partial or complete alignment of the openings 56 in member 54 with openings 58 in valve seat 60 and control of the mixed water passing from central recess 18 through discharge port 30. Thus, maximum discharge of water from mixer valve 10 may be achieved when the openings 56 and 58 are entirely aligned, and regulation between maximum and minimum discharge can be achieved through rotation of stem 48.

It is to be emphasized that stem 48 permits close and virtually microcontrol over the rate of discharge of water from mixer valve 10. However, absolute shutting off of water from mixer valve 10 is best achieved by the rotation of lever handle 47 to a position wherein passageways 36 and 34 of plug 32 are juxtaposed to the plastic face of liner 42 blocking the flow of liquid through intake ports 14 and 16 into central recess 18.

The engagement of spring 62 against member 54 is such that spring 62 is urging member 54 in the same direction as the flow of water through valve 10. In this manner a positive pressure seal is achieved.

The present invention may be embodied in other specific forms without departing from the spirit or essential attributes thereof and, accordingly, reference should be made to the appended claims, rather than to the foregoing specification as indicating the scope of the invention.

I claim:

1. A mixer valve including a body having a pair of intake ports, said intake ports being joined together in the central portion of said body to form a central passageway, a discharge port extending through said body, said discharge port being in communication with said central passageway, a hollow plug rotatably disposed within said central passageway and extending without said body, means for rotating said plug carried on the portion thereof disposed without said body, a sleeve of non-abrasive material having self-lubricating and sealing characteristics fixedly secured within said passageway intermediate the walls thereof and said plug, said sleeve having openings therein in alignment with each of said intake ports, apertures in the wall of said plug adapted to selectively register with the openings in said sleeve whereby the degree of blocking of the latter may be varied upon rotation of the plug, a rotatable stem disposed within said plug and extending beyond both ends thereof, a perforated closure member fixedly carried on the end of said stem within said central passageway, a fixedly perforated valve seat surmounting said discharge port and operatively engaged with said closure member, the perforations in said closure member and valve seat being alignable upon rotation of said stem, a freely rotatable seat juxtaposed to the internal end of said plug, spring means intermediate said closure member and said freely rotatable seat for urging said closure member against said valve seat and operatively engaging said freely rotatable seat with the internal end of said plug, and handle means on said stem for rotating said stem closure member and varying the alignment of the openings in said closure member and valve seat.

2. A mixer valve including a body having a pair of intake ports, said intake ports being joined together in the central portion of said body to form a central passageway, a discharge port extending through said body, said discharge port being in communication with said central passageway, a hollow plug rotatably disposed within said central passageway and extending without said body, said hollow plug including a frustro-conical portion disposed entirely within said passageway and an axially-extending cylindrical sleeve portion partially disposed without said passageway, means for rotating said plug carried on the part of the sleeve portion thereof disposed without said body, a sleeve of non-abrasive material having self-lubricating and sealing characteristics fixedly secured within said passageway intermediate the walls thereof and said plug, said sleeve having openings therein in alignment with each of said intake ports, apertures in the wall of the frustro-conical portion of said plug adapted to selectively register with the openings in said sleeve whereby the degree of blocking of the latter may be varied upon rotation of the plug, a rotatable stem disposed within said plug and extending beyond both ends thereof, a perforated closure member fixedly carried on the end of said stem within said central passageway, a fixed perforated valve seat surmounting said discharge port and operatively engaged with said closure member, the perforations in said closure member and valve seat being alignable upon rotation of said stem, a freely rotatable seat juxtaposed to the internal end of said plug, spring means intermediate said closure member and said freely rotatable seat for urging said closure member against said valve seat and operatively engaging said freely rotatable seat with the internal end of said plug, and handle means on said stem for rotating said stem closure member and varying the alignment of the openings in said closure member and valve seat.

3. A mixer valve including a body having a pair of intake ports, said intake ports being joined together in the central portion of said body to form a central passageway, a discharge port extending through said body, said discharge port being in communication with said central passageway, a hollow plug rotatably disposed within said central passageway and extending without said body, means for rotating said plug carried on the portion thereof disposed without said body, a sleeve of polymerized tetrafluoroethylene resin fixedly secured within said passageway intermediate the walls thereof and said plug, said sleeve having openings therein in alignment with each of said intake ports, apertures in the wall of said plug adapted to selectively register with the openings in said sleeve whereby the degree of blocking of the latter may be varied upon rotation of the plug, a rotatable stem disposed within said plug and extending beyond both ends thereof, a perforated closure member fixedly carried on the end of said stem within said central passageway, a fixed perforated valve seat of polymerized tetrafluoroethylene resin surmounting said discharge port and operatively engaged with said closure member, the perforations in said closure member and valve seat being alignable upon rotation of said stem, a freely rotatable seat juxtaposed to the internal end of said plug, spring means intermediate said closure member and said freely rotatable seat for urging said closure member against said valve seat and operatively engaging said freely rotatable seat with the internal end of said plug, and handle means on said stem for rotating said stem closure member and varying the alignment of the openings in said closure member and valve seat.

4. A mixer valve including a body having a pair of intake ports, said intake ports being joined together in the central portion of said body to form a central passageway, a discharge port extending through said body, said discharge port being in communication with said central passageway, a hollow plug rotatably disposed within said central passageway and extending without said body, said hollow plug including a frustro-conical portion disposed entirely within said passageway and an axially-extending cylindrical sleeve portion partially disposed without said passageway, means for rotating said plug carried on the part of the sleeve portion thereof disposed without said body, a sleeve of polymerized tetrafluoroethylene resin fixedly secured within said passageway intermediate the walls thereof and said plug, said sleeve having openings therein in alignment with each of said intake ports, apertures in the wall of the frustro-conical portion of said plug adapted to selectively register with the openings in said sleeve whereby the degree of blocking of the latter may be varied upon rotation of the plug, a rotatable stem disposed within said plug and extending beyond both ends thereof, a perforated closure member fixedly carried on the end of said stem within said central passageway, a fixed perforated valve seat of polymerized tetrafluoroethylene resin surmounting said discharge port and operatively engaged with said closure member, the perforations in said closure member and valve seat being alignable upon rotation of said stem, a freely rotatable seat juxtaposed to the internal end of said plug, spring means intermediate said closure member and said freely rotatable seat for urging said closure member against said valve seat and operatively engaging said freely rotatable seat with the internal end of said plug, and handle means on said stem for rotating said stem closure member and varying the alignment of the openings in said closure member and valve seat.

References Cited in the file of this patent

UNITED STATES PATENTS

| | | |
|---|---|---|
| 138,143 | Gee | Apr. 22, 1873 |
| 531,585 | Cole | Dec. 25, 1894 |
| 1,313,590 | Engel | Aug. 19, 1919 |
| 1,315,741 | Pranold | Sept. 9, 1919 |
| 1,698,383 | Ashley | Jan. 8, 1929 |
| 2,626,810 | Galera | Jan. 27, 1953 |
| 2,735,645 | Freed | Feb. 21, 1956 |

FOREIGN PATENTS

| | | |
|---|---|---|
| 206,442 | Germany | Feb. 4, 1909 |